(12) United States Patent
Valentian et al.

(10) Patent No.: US 7,406,830 B2
(45) Date of Patent: Aug. 5, 2008

(54) COMPRESSION-EVAPORATION SYSTEM FOR LIQUEFIED GAS

(75) Inventors: Dominique Valentian, Rosny sur Seine (FR); Damien Feger, Vernon (FR); Noël Marchal, Vernonx (FR); François Danguy, Tourny (FR); Olivier Lagnel, Sotteville les Rouen (FR)

(73) Assignee: Snecma, Paris (FR)

( * ) Notice: Subject to any disclaimer, the term of this patent is extended or adjusted under 35 U.S.C. 154(b) by 432 days.

(21) Appl. No.: 11/305,367

(22) Filed: Dec. 16, 2005

(65) Prior Publication Data

US 2006/0222523 A1  Oct. 5, 2006

(30) Foreign Application Priority Data

Dec. 17, 2004  (FR) .................................. 04 13486

(51) Int. Cl.
*F17C 9/02* (2006.01)
*F01K 17/00* (2006.01)
*F04B 23/00* (2006.01)

(52) U.S. Cl. ........................... 62/50.2; 417/313; 60/648
(58) Field of Classification Search .................. 62/50.2; 417/313; 60/671, 648
See application file for complete search history.

(56) References Cited

U.S. PATENT DOCUMENTS

| 2,937,504 | A | | 5/1960 | Riediger | |
|---|---|---|---|---|---|
| 3,068,659 | A | | 12/1962 | Marshall, Jr. | |
| 3,978,663 | A | * | 9/1976 | Mandrin et al. | 60/728 |
| 3,998,059 | A | * | 12/1976 | Randell | 60/659 |
| 4,178,761 | A | * | 12/1979 | Schwartzman | 60/648 |
| 4,444,015 | A | | 4/1984 | Matsumoto et al. | |

(Continued)

FOREIGN PATENT DOCUMENTS

CH   569 865   11/1975

(Continued)

OTHER PUBLICATIONS

"Cycle De Recuperation Des Frigories Contenues Dans Le Gaz Naturel Liquefie"; J. Ribesse; 2007 INIST CNRS.

(Continued)

*Primary Examiner*—William C Doerrler
(74) *Attorney, Agent, or Firm*—Weingarten, Schurgin, Gagnebin & Lebovici LLP

(57) ABSTRACT

The compressor-evaporator system for liquefied gas contained in a tank comprises, in addition to a deice for evaporation by heat exchange with a liquid and devices for conditioning and transferring gas to a pipeline, a motor-driven turbopump comprising a rotary assembly of high bending stiffness on a common shaft line, with at least one high pressure pump, a turbine, and a central electrical machine capable of being used in motor mode or in generator mode. The rotary assembly of the motor-driven turbopump is adapted to present a high speed of rotation, greater than 12,000 rpm, while remaining outside ranges for exciting critical speeds in rotation. All of the internal portions of the motor-driven turbopump are immersed in a cryogenic fluid that is the same as the liquefied gas contained in the tank. The internal cavities of the motor-driven turbopump that are under different thermodynamic conditions are separated by contactless dynamic seals. Electronic power circuits connected to an electricity network control the central electrical machine in motor mode or generator mode.

22 Claims, 10 Drawing Sheets

U.S. PATENT DOCUMENTS

| | | | |
|---|---|---|---|
| 5,649,425 A * | 7/1997 | Matsumura et al. | 60/648 |
| 5,678,411 A | 10/1997 | Matsumura et al. | |
| 6,827,104 B2 * | 12/2004 | McFarland | 137/624.13 |
| 2002/0112479 A1 * | 8/2002 | Keefer et al. | 60/651 |
| 2003/0005698 A1 * | 1/2003 | Keller | 60/643 |
| 2004/0093869 A1 * | 5/2004 | Larjola | 60/670 |
| 2005/0016185 A1 * | 1/2005 | Emmer et al. | 62/50.1 |

FOREIGN PATENT DOCUMENTS

| | | |
|---|---|---|
| EP | 0 470 532 A | 2/1992 |
| EP | 0 470 532 A1 | 2/1992 |
| EP | 0 818 527 A | 1/1998 |
| FR | 2 133 683 | 4/1972 |
| FR | 2 300 216 | 9/1976 |
| FR | 2 318 590 | 2/1977 |
| GB | 1 204 119 | 9/1970 |

OTHER PUBLICATIONS

Ribesse, J. Ed., Association des Ingenieurs Electriciens Sortis de L'Institut Montefiore, "Recuperation cycles of the cold energy contained in liquefied natural gas," Journees Internationales D'Etude des Centrales Electriques Modernes. Liege, Oct. 26-30, 1981, Liege, A.I.M., Belgium, vol. 2 Session 8 (Oct. 26, 1981), pp. 30-1 to 30.8; *Summary in English*—p. 2.

* cited by examiner

US 7,406,830 B2

COMPRESSION-EVAPORATION SYSTEM FOR LIQUEFIED GAS

This application claims priority to a French application No. 04 13486 filed Dec. 17, 2004.

FIELD OF THE INVENTION

The present invention relates to a compressor-evaporator system for liquefied gas contained in a tank, the system comprising extraction and pump means for extracting and delivering liquefied gas under low pressure outside the tank, high pressure pump means, evaporator means operating by heat exchange with a liquid, and means for conditioning and transferring gas to a gas pipeline.

The invention relates to the general field of methods of regassing liquefied gases, and in particular it relates to liquefied natural gas (LNG).

In practice, some of the natural gas that is extracted is liquefied in order to enable it to be conveyed in liquid form in tanker ships between production zones and zones where the gas is consumed. Such a gas transport system thus includes a liquefaction and storage terminal from which methane tankers are filled, and then take the liquefied gas to a terminal for storing it, putting it under pressure, and vaporizing it in order to feed gas via a gas pipeline to a terrestrial distribution network in the consumption zone. The consumption zone terminal is referred to as a regasification terminal.

STATE OF THE PRIOR ART

In order to pressurize and heat up to ambient temperature LNG that is initially in equilibrium in storage tanks of the terminal or in the tanker ships, with its vapor at a pressure slightly greater than atmospheric pressure, the state of the art has, until now, been as shown in FIG. 10, consisting in using initially a low pressure motor-driven pump 302 immersed in the storage tank 301, and feeding a high pressure motor-driven pump 303 immersed in a buffer volume 307. At the outlet from the high pressure pump 303, the liquid is sent to a heat exchanger and evaporator 304 which is either fed with water at ambient temperature when available in abundance (sea water, estuary water, . . . ) where climatic conditions make that possible, or else is fed with hot water (that can be obtained by special-purpose combustion or by recovering heat losses from a nearby heat-generating machine), serving to raise the LNG to high pressure at ambient temperature prior to injecting it into the gas pipeline 400. The motors 305a used for driving the high pressure pumps 303 are generally asynchronous squirrel-cage motors operating at a fixed and limited speed: a maximum of 3000 revolutions per minute (rpm) for three-phase alternating current (AC) at 50 hertz (Hz), and 3600 rpm for AC at 60 Hz. That technology leads to pumps 303 presenting a large number of stages and having large dimensions. In particular, such technology constitutes a definite handicap for any off-shore application. Furthermore, high pressure pumps 303 require a large quantity of electricity, which represents the most expensive financial outlay in the cost of running the terminal.

FIG. 10 is a diagram showing the principle of the prior art regasification method at a methane terminal. The high pressure pumping function and the heating/vaporizing function are geographically grouped together at the terminal, and the number of transfer lines 370, 371, and 372 is restricted to one or two. The diagram shows only one piece of equipment per function, and in addition the valve, regulation, and control equipments are not shown in order to facilitate understanding.

Only three types of valve are shown in the diagram. A valve 3V1 is located at the delivery from an high pressure (HP) pump 303, and a valve 3V2 is located at the inlet to the pipeline 400 acting as a discharge. The valves 3V1 and 3V2 contribute to adjusting flow rate and delivery pressure to the pipeline 400 over the lines 371 and 372. In practice, the valve 3V2 is in series with a stop valve or a check valve. Finally, a valve 3V3 enables LNG at low pressure to be recycled to the tank 301 or to a special circuit via a line 373 for initial cooling purposes prior to starting the HP pumps 303. The LNG is extracted from the tank 301 by a low pressure (LP) motor-driven pump 302 and it is delivered to the inlet of the HP pumps 303, after which it passes through a heat exchanger and evaporator 304 prior to being injected in the form of gas under pressure into the pipeline network 400. Water is fed to the evaporator 304 via a feed circuit 374 and is evacuated by an evacuation circuit 375.

The presence of a cold source at very low temperature and that needs to be heated in the industrial process constitutes an opportunity for extracting value, and numerous uses exist or have been proposed in prior publications or patents. By way of example, mention can be made of associating the terminal with refrigeration installations or installations for liquefying industrial gases. Amongst all of the possible uses for the low temperature of LNG, the present description is limited to solutions for adapting the compression and heating and evaporation method in order to recover energy that can be used directly by the terminal.

When considering the thermodynamic aspects of the method, which method consists initially in increasing the pressure of the LNG by means of pumps, and secondly in increasing its temperature and its enthalpy by the heat exchangers and evaporators, two possible schemes can be identified for recovering energy:

A first scheme consists, during pumping, in raising the pressure of the liquid natural gas to a pressure that is higher than that required, and then in expanding it down to the pressure of the gas pipeline through a turbine serving to transform said fluid energy into mechanical energy. The energy balance is then positive since the enthalpy recovered in the turbine by expanding the gas is greater than the additional energy that needs to be provided for pumping.

A second scheme consists in using the liquid natural gas as a cold source in a thermodynamic cycle that uses a hot source at ambient temperature or at a higher temperature.

Those various energy-recovery principles have constituted the subject matter in the past of numerous patents or communications, such as, for example, the following patent documents: U.S. Pat. No. 2,937,504, U.S. Pat. No. 3,068,659, FR 2 133 683, CH 569 865, FR 2 300 216, FR 2 318 590, U.S. Pat. No. 4,444,015, EP 0 470 532, and also the article XP-003 079414 (1981) by J. Ribesse (Distrigaz-Belgium) entitled "Cycles de récupération des frigories contenues dans le gaz naturel liquéfié" [Cycles for recovering the frigories contained in liquefied natural gas].

Those documents set out essentially to describe the principle of energy recovery cycles, and in general they do not give an example that could constitute a concrete application.

U.S. Pat. No. 5,678,411 describes an application that is more precise, with a turbopump used in a device implementing natural gas evaporation in a heat exchanger fed with sea water, the turbine providing drive power to the pump from the partial expansion of the gas vaporized by the heat exchanger. Nevertheless, the enthalpy of the gas is sufficient only to obtain an outlet pressure of 3 megapascals (MPa) to 6 MPa. That pressure is too low for numerous gas pipelines, and in particular for the European network in which the feed pressure is close to 8 MPa, and can reach 10 MPa in certain applications. This comes from the characteristics of natural gas, which is made up essentially of methane, having its critical point situated at 4.596 MPa and 190.5 kelvins (K). The enthalpy difference in adiabatic expansion between 15 MPa, 273 K, and 10 MPa (thus close to the critical point) is less than the power required for compressing the liquid from 0.5 MPa to 15 MPa.

To avoid that problem, U.S. Pat. No. 5,649,425 heats the natural gas upstream from the turbine to above ambient temperature by means of a burner running on natural gas and air. Such heating enables more enthalpy to be recovered in the turbine and thus compensates for the pumping energy, but at the price of the economic loss represented by the gas that is burnt, and also by the electrical power used in a high pressure pump. That U.S. Pat. No. 5,649,425 proposes a second solution: the pump is a two-stage pump (or a pump having two groups of stages) with the entire flow of LNG passing through the first pump stage, and with a fraction of the main flow then being raised to a higher pressure, then heated and vaporized in the heat exchanger to drive the turbine. The flow of LNG coming from the first stage is used for auxiliary functions, such as feeding a power station, for example.

That solution can be used only insofar as the gas terminal is coupled to a power station to which it can deliver gas at two pressure levels.

High pressure pumps also present the following disadvantages:

a) they are driven by non-regulated squirrel-cage asynchronous motors revolving at relatively low speed (3000 rpm to 3600 rpm) and they require a large number of stages (typically ten to 20) to achieve the require pressure rise;

b) such a pump arrangement having a large number of centrifugal stages leads to machines of large dimensions (typically 6 meters (m) tall) that are expensive, heavy, and bulky, and that are also relatively intolerant to any increase in the pressure in gas pipelines, should the need arise;

c) they are limited in flow rate by the power limitation of such motors (1 megawatt (MW) to 2 MW) and they need to be used in parallel in order to deliver gas at the rate required from the terminal; and d) their motors are not regulated and their gas flow rate can be servo-controlled only by means of throttle valves located on the delivery outlet, and that technique is very penalizing in terms of electricity consumption.

OBJECT AND BRIEF DESCRIPTION OF THE INVENTION

The invention seeks to remedy the above-mentioned drawbacks and to make it possible to reduce or even eliminate the electricity consumption of a regasification LNG terminal.

The invention thus seeks to provide global and economically viable solutions for regasification LNG terminals enabling them to reduce or even eliminate electricity consumption, or possibly even become producers of electricity, while simultaneously remedying the above-mentioned drawbacks of existing systems. The invention is also well adapted to particular configurations in which the terminal is coupled to a power station using thermal machines, with the heat losses from the power station being recovered and transferred to the heat exchangers and evaporators of the terminal. The invention is also applicable to any industrial process implementing compression and heating to ambient temperature of a liquefied gas.

These objects are achieved by a compressor-evaporator system for liquefied gas contained in a tank, the system comprising extraction and pump means for extracting and delivering liquefied gas under low pressure outside the tank, high pressure pump means, evaporator means operating by heat exchange with a liquid, and means for conditioning and transferring gas to a gas pipeline, the system comprising at least one turbomachine constituted by a motor-driven turbopump comprising a rotary assembly having very high bending stiffness on a common shaft line, with at least one high pressure pump comprising an axial suction stage and at least one centrifugal wheel, a turbine, and a central electrical machine capable of being used in motor mode or in generator mode and situated between the high pressure pump and the turbine, said motor-driven turbopump being arranged in compact manner inside a rigid casing that presents static seals only with the surrounding medium, the rotary assembly of the motor-driven turbopump being adapted to present a high speed of rotation, greater than 12,000 rpm, while remaining outside the excitation ranges of critical speeds of rotation, all of the internal portions of the motor-driven turbopump being immersed in a cryogenic fluid that is the same as the liquefied gas contained in the tank, the internal cavities of the motor-driven turbopump that are under different thermodynamic conditions being separated by contactless dynamic seals, and electronic power circuits connected to an electricity network serving to control the central electrical machine in motor mode or generator mode.

Advantageously, the speed of rotation of the rotary assembly of the motor-driven turbopump is several tens of thousands of revolutions per minute (rpm), and preferably lies in the range 20,000 rpm to 40,000 rpm.

Various embodiments are possible, and in particular, in accordance with the invention, a motor-driven turbopump can be implanted either directly on the delivery line of the terminal, or in parallel between the outlet from a high pressure pump and a regasification heat exchanger.

In an advantageous particular embodiment, the system includes a first heat exchanger and evaporator interposed between the high pressure pump and the turbine to compress and to evaporate the liquefied gas used as the working fluid in the motor-driven turbopump.

The evaporator means may comprise said first heat exchanger and evaporator interposed between the high pressure pump and the turbine, and a second heat exchanger and evaporator disposed between the turbine and the pipeline to be fed.

In a particular embodiment, the high pressure pump means comprise exclusively the high pressure pump of the motor-driven turbopump connected in series between the tank and the pipeline.

The system may include a buffer volume disposed at the inlet to the high pressure pump of the motor-driven turbopump.

In a particular embodiment, the system further comprises a condenser with a first circuit interposed between the outlet of the high pressure pump of the motor-driven turbopump and the first heat exchanger and evaporator, and a second circuit interposed between the outlet of the turbine of the motor-driven turbopump and the buffer volume, the second circuit being in heat exchange with the first circuit to reliquefy the gas leaving said turbine.

In another particular embodiment, the high pressure pump means comprise a motor-driven pump having its inlet connected to said extraction and pump means, and having its outlet connected to a first circuit of a condenser, the outlet from said first circuit being connected to the inlet of a heat exchanger and evaporator whose outlet is connected to said pipeline, said buffer volume is in a branch connection connected to the outlet of said motor-driven pump, and the outlet from the turbine of the motor-driven turbopump is connected to the inlet of a second circuit of the condenser, the outlet from said second circuit being connected to said buffer volume, the second circuit being in heat exchange with the first circuit to reliquefy the gas leaving said turbine.

Advantageously, the means for evaporation by heat exchange with a liquid comprise means for introducing and evacuating a liquid constituted by water at a temperature that is not less than ambient temperature.

Similarly, the first heat exchanger and evaporator interposed between the high pressure pump and the turbine includes means for introducing and evacuating a liquid constituted by water at a temperature that is not less than ambient temperature.

In a possible embodiment, the motor-driven turbopump includes hydrostatic fluid bearings fed with a fluid in the liquid and compressed state that is the same as the fluid available from the outlet of the high pressure pump of the motor-driven turbopump.

The motor-driven turbopump may also include an active hydraulic device for balancing axial forces, which device is fed with a fluid in the liquid and compressed state that is the same as the fluid available from the outlet of the high pressure pump of the motor-driven turbopump.

In a variant embodiment, the motor-driven turbopump includes an axial fluid abutment fed with a fluid in the liquid and compressed state that is the same as the fluid available from the outlet of the high pressure pump of the motor-driven turbopump.

In another possible embodiment, the motor-driven turbopump includes active magnetic bearings and may also include a magnetic axial abutment.

In yet another possible embodiment, the motor-driven turbopump includes high speed ball bearings with ceramic balls.

Advantageously, the turbine of the motor-driven turbopump comprises a rotor of high-strength titanium alloy of the TA6 V ELI or TA5 E ELI type or of light alloy of the aluminum-lithium type.

Similarly, the high pressure pump of the motor-driven turbopump comprises one or more impellers of high-strength titanium alloy of the TA6 V ELI or TA5 E ELI type or of light alloy of the aluminum-lithium type.

In a particular embodiment, the central electrical machine of the motor-driven turbopump comprises a permanent magnet rotor, the electronic power circuit delivering power at a frequency synchronous with the speed of rotation and at variable voltage in motor mode, and converting the variable voltage that is created in generator mode into a rectified constant voltage.

In another particular embodiment, the central electrical machine of the motor-driven turbopump has a one-piece rotor with an excitation coil fed by a rotary transformer and a rectifier diode bridge for regulating the excitation of the electrical machine and for providing a constant voltage in generator mode and controlled torque in motor mode.

In yet another particular embodiment, the central electrical machine of the motor-driven turbopump includes a squirrel-cage rotor, the electronic power circuit delivering power at variable voltage and frequency in motor mode and converting the variable voltage that is created in generator mode into a rectified constant voltage.

BRIEF DESCRIPTION OF THE DRAWINGS

Other characteristics and advantages of the invention appear from the following description of particular embodiments of the invention given as examples, with reference to the accompanying drawings, in which.

DETAILED DESCRIPTION OF PARTICULAR EMBODIMENTS

The invention applies in particular to a regasification terminal for LNG and seeks to reduce or even eliminate the electricity consumption of such a terminal by implementing a specific turbomachine referred to as a motor-driven turbopump (or MTP) suitable for application to various energy recovery cycles.

The invention relates to a compressor-evaporator system for liquefied gas which further comprises conventional means implemented to compress and heat and evacuate liquefied gas, i.e.: extraction and centrifugal pump means for delivering liquid gas at low pressure outside the tank; high pressure pump means and means for evaporation by heat exchange with water at ambient temperature or with hot water; and means for conditioning and transferring gas to a gas pipeline.

The compressor-evaporator system of the invention includes additional means comprising at least one specific turbomachine associated with one or more heat exchangers and with fluid flow and control equipment for recovering energy in thermal or electrical form. The additional turbomachine may be implanted either directly on the delivery line from the terminal going from the liquefied gas tank and leading to the pipeline, or in a parallel branch connection between the outlet from a high pressure motor-driven pump and a regasification heat exchanger.

Figure 5:
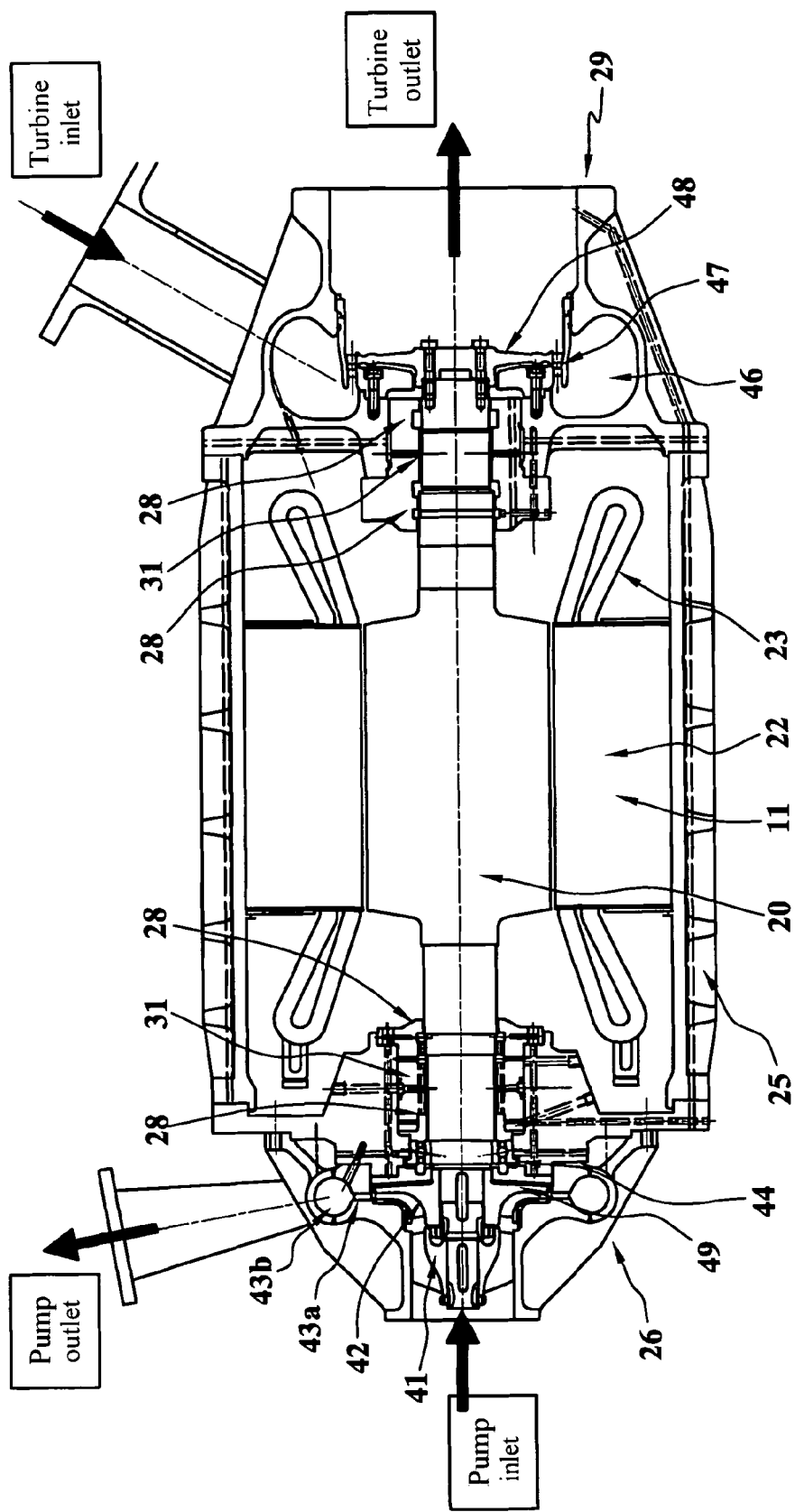
FIG. 5 is a diagrammatic axial section view of an example of a motor-driven turbopump that can be used in a liquefied gas compressor-evaporator system in accordance with the invention.

The additional turbomachine or motor-driven turbopump combines, on a single shaft line: a pump 26; an electrical machine 11 that can be used in motor mode or in generator and that can be referred to equally well as an alternator; and a turbine 29; the electrical machine 11 being disposed centrally between the pump 26 and the turbine 29 (FIG. 5).

The motor-driven turbopump is designed to be capable of rotating at a speed that is very much higher than the speed of conventional high-pressure motor-driven pumps. The speed of rotation of a motor-driven turbopump is thus greater than 12,000 rpm and may advantageously be as high as several tens of thousands of revolutions per minute, typically lying in the range 20,000 rpm to 40,000 rpm, where the speed merely needs to lie outside the excitation ranges for critical speeds of the motor-driven turbopump.

The motor-driven turbopump with its central electrical machine 11 comprises a rotary assembly having very great stiffness in bending on a common shaft line and it is arranged in compact manner inside a rigid casing 25 that presents static seals only with the ambient medium (FIG. 5).

All of the internal portions of the motor-driven turbopump are immersed in a common cryogenic fluid in liquid or gaseous form coming from the tank of liquefied gas to be evaporated or of the same nature.

The pump portion 26 comprises an axial suction stage 41 adjacent to a first centrifugal wheel 42. One or more centrifugal wheels may be added to the first centrifugal wheel 42, where necessary. A vaned diffuser 43a and a volute 43b or a vaned diffuser and a return channel serve to recover the kinetic energy of the fluid at the outlet from each centrifugal wheel. The successive centrifugal wheels are thus fed by the return channels. The pump 26 compresses the liquid gas introduced into the axial suction stage.

The turbine 29 comprises a pressurized gas inlet manifold 46, a vaned nozzle 47 for bringing the gas up to speed, and a rotor 48 for transforming the kinetic energy of the gas into mechanical energy.

By way of example, the turbine 29 may be of the total admission axial type, in a one- or two-stage application, and it may be supersonic, transonic, or subsonic.

The turbine 29 may also be of the single-stage centripetal type.

The central electrical machine 11, which may also be referred to as an alternator, can operate in motor mode to deliver the additional power needed to enable the pump 26 to operate properly. The electrical machine 11 can also operate in generator mode to deliver any excess energy in the turbine-pump balance in the form of electricity. The electrical machine 11 is connected to electronic power circuits 12 which are connected to an electricity network 13 for controlling the electrical machine in motor mode or in generator mode (FIGS. 1 to 4 and 9).

Figure 6:
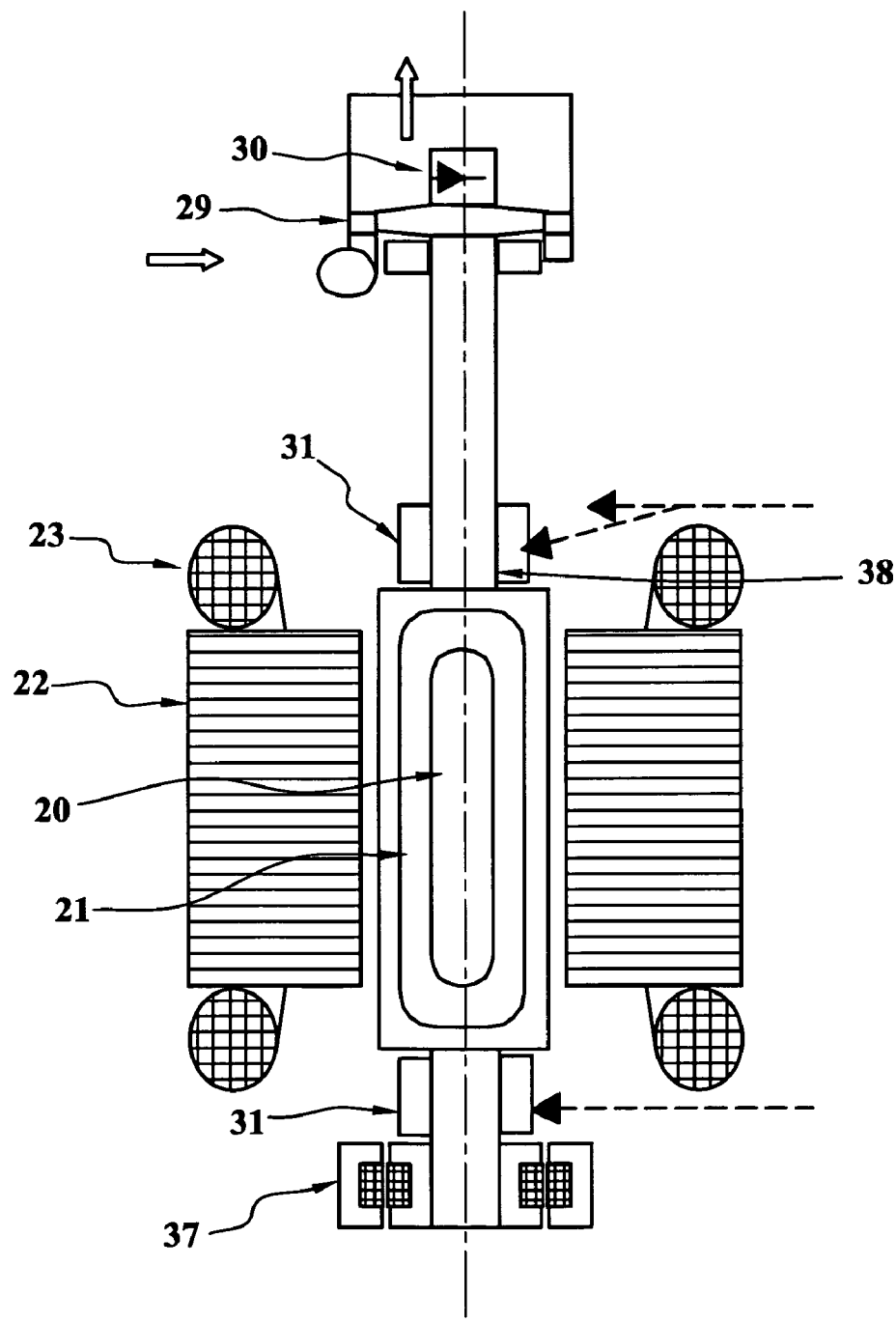
FIG. 6 is a diagrammatic axial section view showing an example of a central electrical machine suitable for use with a motor-driven turbopump in accordance with the invention.

The electrical machine 11 comprises a stator magnetic circuit 22 and stator coils 23 (FIGS. 5 and 6).

The electrical machine 11 further comprises a rotor 20 presenting a peripheral speed that is high, typically of the order of 250 meters per second (m/s). The rotor 20 thus needs to be made using a technology that is compatible with such a speed of rotation. By way of example, the rotor 20 may be constituted by a laminated squirrel-cage rotor. Under such circumstances, the electronic circuits 12 deliver power at variable voltage and frequency in motor mode and, in generator mode, convert the varying voltage from the machine into a rectified constant voltage.

The rotor 20 secured to a shaft 38 may advantageously be made, as shown in FIG. 6, in the form of a one-piece high-strength steel rotor with an excitation coil 21 fed by a rotary transformer 37 associated with rectifier diodes 30 so as to regulate the excitation of the machine and provide a constant voltage in generator mode and a controlled torque in motor mode.

The rotor 20 may also have permanent magnets for providing power at a frequency that is synchronous with the speed of rotation and at a voltage that varies in motor mode, and for converting the varying voltage delivered by the machine in generator mode into a rectified constant voltage.

By integrating the electrical machine 11 on a common shaft 9 between the pump 26 and the turbine 29, a rotary assembly is obtained that presents a high level of bending stiffness, thus enabling the motor-driven turbopump to operate below its critical speed in bending up to a high speed of rotation of the order of several tens of thousands of revolutions per minute.

Advantageously, the rotor 48 of the turbine 29 and the impellers 41, 42 of the pump 26 are made of high-strength titanium alloy, e.g. of the TA6 V ELI or TA5 E ELI type, or of light alloy, e.g. of the aluminum-lithium type. Such use of alloys having a high value for the ratio of elastic limit over density makes it possible to produce a one-piece motor-driven turbopump that is very compact because even with a delivery pressure of 10 MPa to 20 MPa, the rotary elements retain good mechanical strength and the number of stages can be greatly reduced, both in the pump and in the turbine.

The rotary assembly of the motor-driven turbopump can be supported by two hydrostatic fluid bearings 31 (FIG. 5).

When the motor-driven turbopump is fitted with fluid bearings 31, dynamic seals 28 can be disposed between the pump 26, the fluid bearing 31 situated beside the pump 26, between said fluid bearing 31 situated beside the pump 26 and the electrical machine 11, between the electrical machine 11 and the fluid bearing 31 situated beside the turbine 29, and between said fluid bearing 31 situated beside the turbine 29 and the turbine 29.

The casing 25 of the motor-driven turbopump is compact, very rigid, and, relative to the ambient medium, presents seals that are static only. The casing 25 is designed to minimize thermal losses between the turbine 29 and the pump 26 while still keeping the bearings in alignment.

A rolling bearing 44 could optionally be provided to act as an emergency bearing and as an axial rotary abutment that acts during the appearance of transients in the motor-driven turbopump so as to take up forces, particularly when the speed of rotation is too small for the pressures available in the motor-driven turbopump to enable forces to be balanced, or else in the event of a breakdown.

Nevertheless, it should be observed that all of the internal portions of the motor-driven turbopump are immersed in the same cryogenic fluid in liquid or gaseous form, with the contactless dynamic seals 28 separating the internal cavities that are under different thermodynamic conditions.

The dynamic sealing barriers 28 may be made up of labyrinth seals or simple floating ring seals, or of pairs of labyrinth seals or floating ring seals with leakage recovery so as to confine the fluids in each of the internal cavities of the motor-driven turbopump.

The fluid bearings 31 are fed with liquid under high pressure taken downstream from the last centrifugal wheel of the pump 26.

The last centrifugal wheel(s) 42 of the pump 26 and the facing stator portion are of shapes that are designed in such a manner as to form one or two fluid flow constrictions 49, these constrictions being of section that is variable depending on the relative position between the rotor and the stator of the pump 26 and constituting an axial balancer device enabling the local pressure field that opposes the resultant of the axial forces on the rotary assembly to be modified.

The internal ducts and the architecture of the motor-driven turbopump are designed in such a manner as to optimize the recirculation needed for feeding the fluid bearings 31, and the axial balancer device 49, while also cooling the electrical machine 11 and the evacuation of fluid to the pump inlet or to the circuit downstream from the turbine 29.

Where appropriate, the active axial balancer device 49 may be replaced by a fluid abutment fed with high pressure from the pump 26.

The fluid bearing 31, and where appropriate the fluid abutment, can be fed from an additional external source of the same fluid in the liquid and compressed state as the liquefied fluid coming from a main tank and that is to feed a pipeline. When the main fluid is LNG, the additional external source may be, for example, a regasification LNG terminal that has pressurized liquid natural gas available. The fluid bearings 31 can be fed from the additional external source either permanently, or else only during transient operating stages of the motor-driven turbopump.

The electrical machine 11 can be cooled for example by circulating gas taken from the inlet of the turbine 29 and expanded to a pressure slightly greater than the pressure of the evacuation circuit, so as to maintain the fluid in a thermodynamic state that is gaseous or slightly two-phase. This selection is intended to minimize losses by viscous friction in the airgap.

As mentioned above, the hydraulic balancer device 49 and the fluid bearings 31 are fed directly with liquid natural gas taken from the high pressure portion of the pump 26 via internal recirculations. The fluid bearings 31 may also be fed continuously from high pressure liquid or gas sources available at the terminal, or they may be fed from such sources merely before and during transient stages so long as the pressure delivered by the pump 26 is not sufficient.

The architecture proposed for the motor-driven turbopump makes it possible to condition all of its internal volumes with natural gas in liquid or vapor form so that its seals relative to the external surroundings are purely static. The pump 26, the fluid bearings 31 and possibly also the electrical machine 11 are in a liquid environment, while the other internal volumes are in a gaseous environment. Each cavity presenting a different pressure or a different quality of fluid between adjacent cavities is confined by the dynamic seals 28 implemented as labyrinth type seals or as floating ring type seals, thereby minimizing leaks and ensuring that the machine does not suffer wear by friction contact. The dynamic seals 28 are mounted singly or in pairs, depending on requirements, and when in pairs, the low pressure leaks are collected between each pair of sealing seals and wherever possible evacuated to downstream from the turbine 29 or reincorporated to the inlet of the pump 26.

In a variant, the electrical machine 11 may be cooled by circulating a fluid in the liquid phase. Under such circumstances, since the electrical machine is operated in a temperature environment of less than 150 K, its performance is improved. The stator of the electrical machine 11 is then lined in such a manner as to minimize liquid friction losses in the airgap.

In another possible embodiment, the hydrostatic fluid bearings 31 can be replaced by active magnetic bearings. Such bearings are completely insensitive to wear and thus give the motor-driven turbopump a very long lifetime.

Under such circumstances, the hydraulic device 49 for balancing the axial forces acting on the rotary assembly of the motor-driven turbopump can also be replaced by an active axial magnetic abutment.

For an application to LNG and when the motor-driven turbopump is fitted with magnetic bearings, the active magnetic bearings and the electrical machine 11 is conditioned in natural gas in the liquid or gaseous state, and the dynamic seals 28 are reduced to two, one situated between the pump 26 and the bearing situated beside the pump 26, and the other between the turbine 29 and the bearing situated beside the turbine 29.

With fluid bearings or magnetic bearings that present particularly low bearing stiffnesses, it is possible to have a speed of rotation in stabilized normal operation that is situated, for example, between the first two modes of the bearings and the first critical speed in bending of the rotary assembly.

In the motor-driven turbopump of the invention, the pump 26 is used for compressing a liquid fluid at low temperature, such as liquefied natural gas, and the turbine 29 provides mechanical energy to the pump 26 by expanding the same fluid when in the gaseous state.

The electrical machine 11 provides additional mechanical energy to the pump 26 if the turbine 29 does not provide enough, or on the contrary it evacuates the excess energy from the turbine 29 by producing electrical power.

Figure 9:
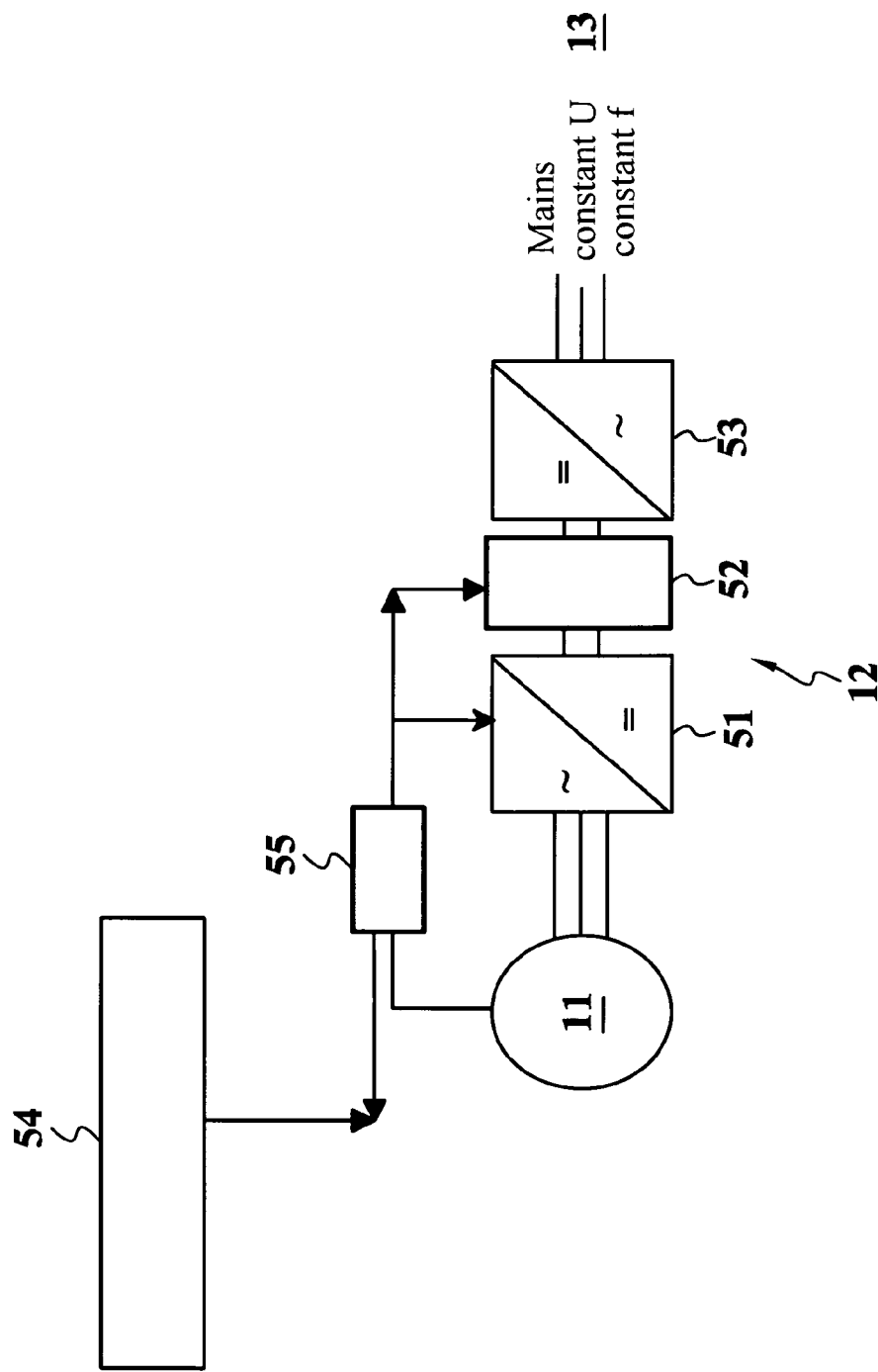
FIG. 9 is a block diagram showing the main modules constituting the electronic power circuits for controlling the central electrical machine of a motor-driven turbopump used in the context of the present invention.

As shown in FIG. 9, the electrical machine 11 is controlled in motor mode or in generator mode by electronic power circuits 12 connected to an electricity network 13 of frequency f and of nominal voltage U that are determined.

The electronic circuits 12 may comprise a rectifier 51, a voltage converter 52, and an inverter 53 interposed between the electrical machine 11 and the electrical power supply network 13.

The set of circuits 12 serves to manage power transfer in both directions from the motor-driven turbopump to the network 13 when operating in generator mode, and from the network 13 to the motor-driven turbopump when operating in motor mode. Circuits 55 servo-control the torque and the speed of rotation of the electrical machine 11 and are connected to the machine, to the rectifier 51, and to the voltage converter 52. The electronic power circuits 12 also include circuits 54 for controlling various valves associated with the motor-driven turbopump.

The motor-driven turbopump can be operated at an appropriate speed regardless of the energy balance between the pump 26 and the turbine 29: when the balance is in favor of the turbine 29, the electronic circuits divert excess power to the local network 13 by adapting its voltage and frequency characteristics, and conversely they deliver the appropriate frequency and voltage characteristics to the motor 11 in the event of the pump 26 requiring more power that is available from the turbine 29. The device is thus entirely capable of controlling transients on starting or stopping the motor-driven turbopump and of ensuring that the system operates properly. The electronic circuits are adapted to the particular technology chosen for the electrical machine 11.

When the electrical machine 11 is of the variable excitation type, then the electronic circuits can be very simple. The constant voltage delivered at the outlet of the electrical machine 11 enables the voltage converter module 52 to be omitted.

When the electrical machine 11 is of the squirrel-cage or permanent magnet type, the voltage converter module 52 is necessary and a rotor position sensor is also necessary for controlling phasing in motor mode or in generator mode.

Figure 1:
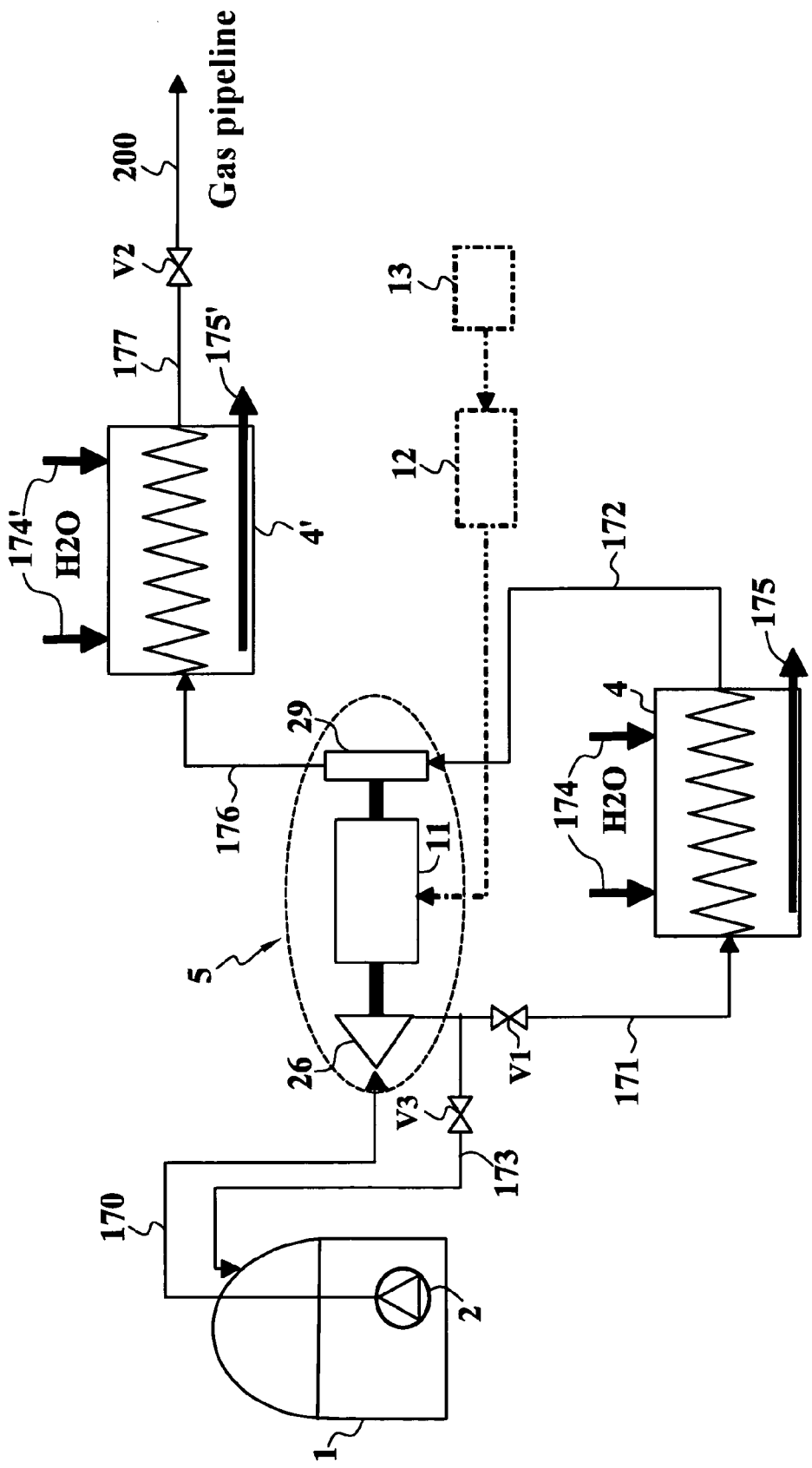
FIGS. 1 to 4 are overall diagrammatic views of a compressor-evaporator system for liquefied gas respectively in first, second, third, and fourth embodiments of the invention.
Figure 2:
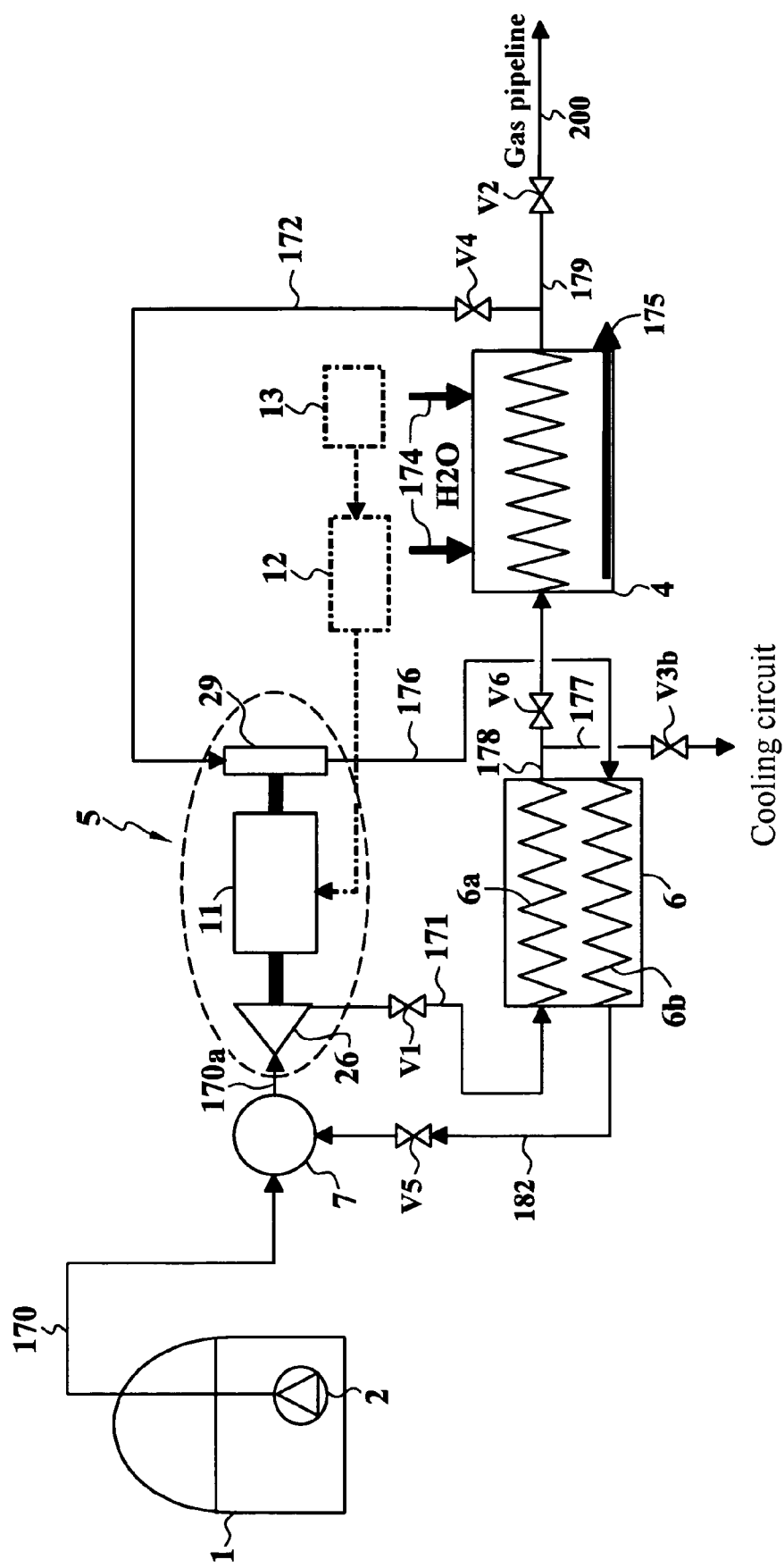

There follows a description with reference to FIGS. 1 to 4 of an application of the above-described motor-driven turbopump to various types of cycles for recovering energy from a regasification terminal having a liquefied gas tank 1 with a low pressure motor-driven pump 2 installed therein to deliver liquefied gas to the inlet of a high pressure pump via a line 170 (FIGS. 1, 3, and 4), or 170, 170*a* (FIG. 2).

For the cycle shown in FIG. 1, the single high-pressure motor-driven pump used is constituted by the high-pressure pump 26 of the motor-driven turbopump 5 as described above. The pump 26 is then designed to deliver pressure higher than the pressure needed for feeding the gas pipeline 200. The gas coming from the tank 1, after being vaporized and heated to ambient temperature in a first heat exchanger and evaporator 4, can thus be expanded in the turbine 29 down to the inlet pressure for the pipeline 200, thereby delivering mechanical energy which reduces the energy that the electric motor 11 needs to supply for driving the pump 26, since the change in enthalpy per pressure unit in the gaseous state is greater than that in the liquid state.

The gas delivered by the turbine 29 is at a temperature below ambient so it needs to be subjected to additional heating by passing through a second heat exchanger 4' operating with water at ambient temperature (sea water or river water), delivered by a circuit 174' and evacuated by a circuit 175'.

It is possible to introduce hot water into the circuit 174 for introducing water to the first heat exchanger and evaporator 4, e.g. water at a temperature of about 40° C. to 50° C., obtained by recovering heat losses from nearby plant producing electricity or from some other co-generation source, so as to increase the temperature at the inlet to the turbine 29, with the hot water being evacuated normally from the heat exchanger and evaporator 4 by the water evacuation circuit 175. When using hot water, the second heat exchanger 4' situated downstream from the turbine 29 can be omitted and the energy produced by the turbine 29 is greatly increased. Such a configuration makes it possible for the energy delivered by the turbine 29 to supply all of the energy required for pumping, and even to provide a positive balance enabling the alternator 11 to operate as a generator.

In FIG. 1, there can be seen a regulation valve V1 situated on the delivery line 171 from the high pressure pump 26 leading to the inlet of the heat exchanger and evaporator 4. The outlet from the heat exchanger and evaporator 4 is connected by a line 172 to the inlet of the turbine 29. The outlet of the turbine 29 is connected by a line 176 to the inlet of the second heat exchanger and evaporator 4'. The outlet therefrom is connected to a line 177 leading to the pipeline 200 and having a valve V2 situated therein for isolating the pipeline from the compressor-evaporator system constituting a pressure regulator.

A valve V3 is situated in a cooling line 173 connected in parallel to the outlet from the high pressure pump 26 and returning to the tank 1.

In the embodiment shown in FIG. 1, the motor-driven turbopump 5 is always associated with a first heat exchanger and evaporator 4 situated upstream from the turbine 29 and downstream from the pump 26, and where appropriate it is also associated with a second heat exchanger and evaporator 4' situated downstream from the turbine 29.

The embodiment of FIG. 1 makes it possible to avoid installing a complex system for distributing flows to each turbine 29 of a motor-driven turbopump 5. There is no need to provide the high pressure pump 26 with equipment for cooling or recycling in addition to the equipment that already exists. On the contrary, the presence of the electronic power regulation circuits 12 enables the speed of the motor-driven turbopump 5 to be regulated so that, where appropriate, the regulation valve V1 situated at the delivery from the high pressure pump 26 to the line 171 can be omitted.

Figure 7:
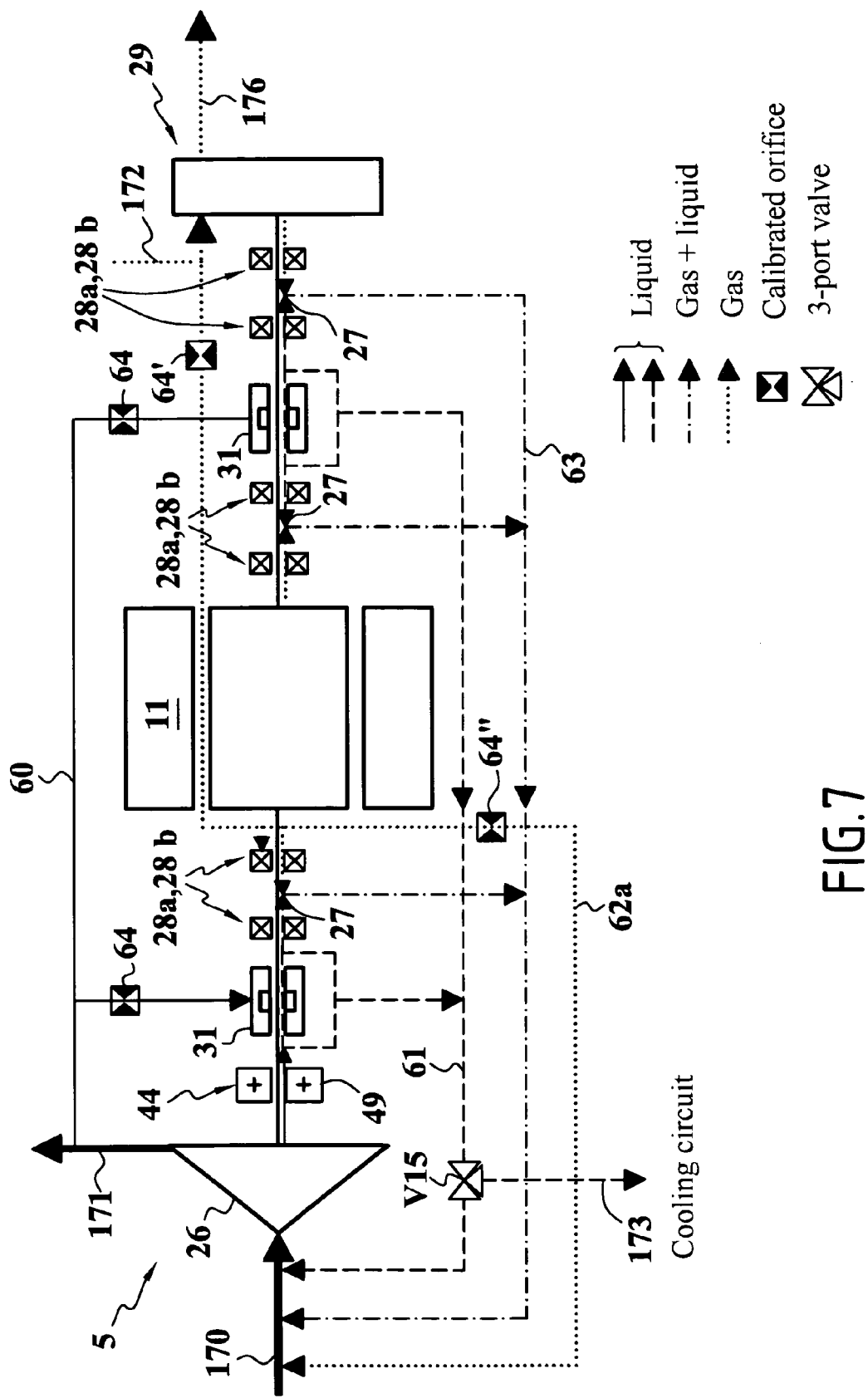
FIG. 7 is a diagrammatic view showing the circulation of fluids in a motor-driven turbopump used in the context of the embodiment of FIG. 1.

FIG. 7 shows the arrangement of the various components and the paths followed by the flows inside a motor-driven turbopump 5 implemented in the context of the application shown in FIG. 1.

In FIG. 7, it can be seen that the dynamic seals form double barriers 28a, 28b and define cavities 27 between dynamic seals from which leaks through the dynamic seals can be collected via a line 63 which then reinjects the fluid recovered from the cavities 27 into the inlet of the HP pump 26.

In FIG. 7, reference 60 designates a line feeding the fluid bearings 31 with natural gas in the liquid state taken from the outlet of the last centrifugal wheel of the pump 26, or where appropriate, taken directly from a high pressure liquid line of the terminal in which the tank 1 is located. The rate at which the fluid bearings 31 are fed is determined by calibrated orifices 64. The liquid natural gas is collected at low pressure from the outlet of the fluid bearings and is reinjected to the inlet of the pump 26 by a line 61.

The cooling flow of the electrical machine 11 is taken from the inlet to the turbine 29, expanded through a calibrated orifice 64', and subjected to additional expansion through a second calibrated orifice 64" situated at the outlet from the electrical machine 11 prior to being reinjected by a line 62a into the inlet of the pump 26.

FIG. 7 also shows a three-port valve V15 situated in the circuit 173 for cooling the fluid bearings 31.

The fluid bearings 31 can be fed and the electrical machine 11 can be cooled via ducts pierced through the casings of the motor-driven turbopump or via external pipework.

When a hydraulic device 49 is used for balancing the axial forces exerted on the rotary assembly of the motor-driven turbopump 5, that device is provided with calibration devices on the flow traveling over the back of the balancing plate for the purpose of adapting the pressure field so as to cancel the resultant of the forces.

Figure 10:
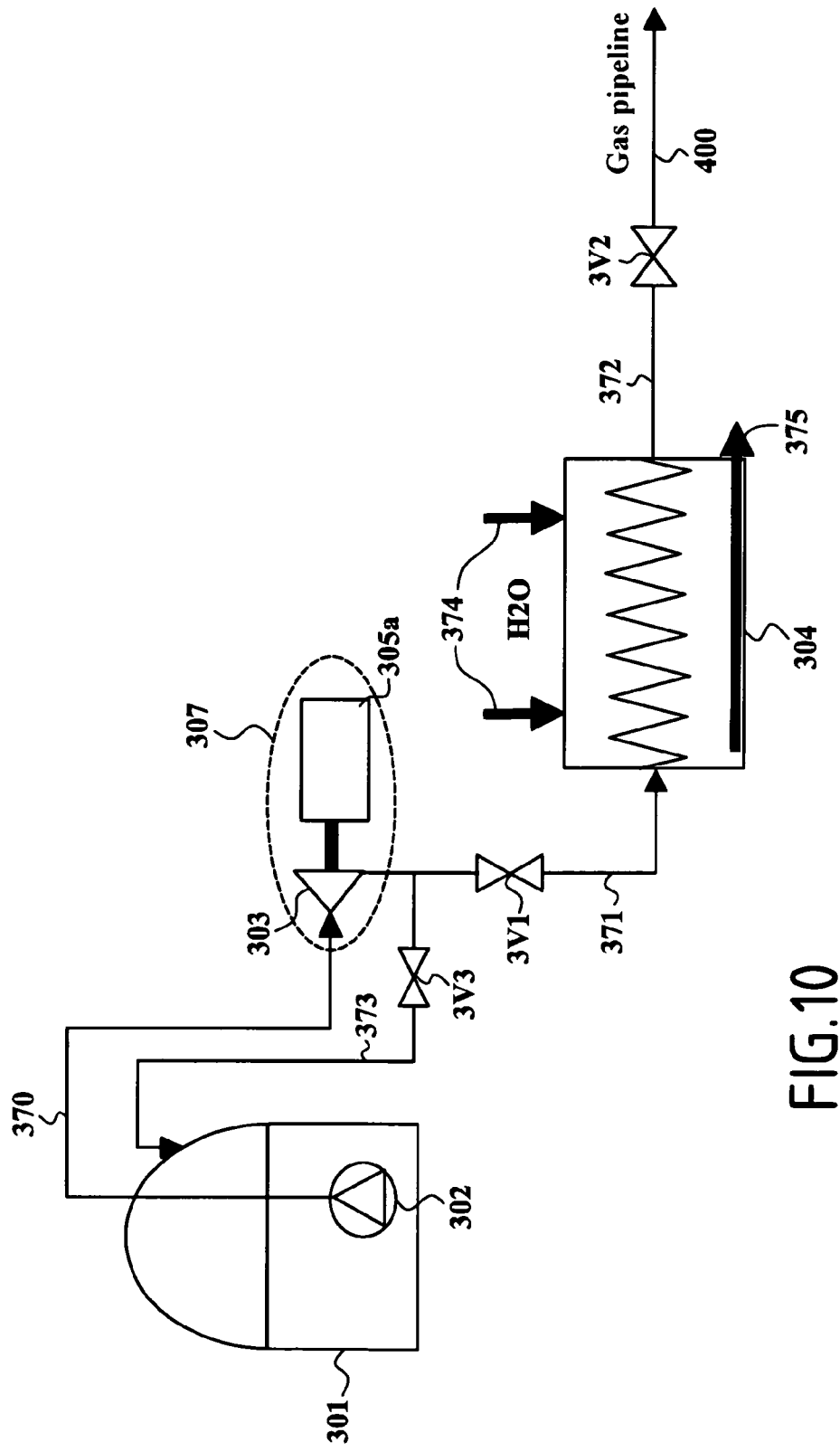
FIG. 10 is a diagrammatic view of an example of a prior art liquefied gas compressor-evaporator system.

FIG. 2 shows another example of an energy recovery cycle in which, as in the cycle of FIG. 1, a conventional high pressure motor-driven pump 303 of a terminal (as shown in FIG. 10) is replaced by a motor-driven turbopump 5. However, in the FIG. 2 embodiment, the pressure at the outlet from the high pressure pump 26 of the motor-driven turbopump 5 is not increased. A fraction of the fluid flow passing through the pump 26 is taken from the outlet of the heat exchanger and evaporator 4 and conveyed via a line 172 fitted with an isolator valve V4 to the turbine 29 in order to be expanded to low pressure in said turbine 29 prior to being evacuated via a line 176 in order to pass through another heat exchanger 6 acting as a condenser. The reliquefied fluid from the circuit 6b of the heat exchanger and condenser 6 is reinjected in liquid form by a line 182 fitted with an isolator valve V5 into a volume 7 that serves to eliminate any bubbles that might remain in the condensate and that is situated at the inlet to the high pressure pump 26.

The main flow of liquefied gas taken by the HP pump 26 from the line 170a connecting it to the volume 7 flows on leaving said pump in a line 171 fitted with a regulation valve V1 and passes through a circuit 6a of the condenser 6. The outlet flow from the circuit 6a of the condenser 6 is taken by a line 178 fitted with an isolator valve V6 to the inlet of the heat exchanger 4 using water at ambient temperature (introduced via the circuit 174 and evacuated by the circuit 175). The flow of liquid passing through the circuit 6a of the condenser 6 acts as a cold source enabling the circuit 6b to condense the fluid flowing in the line 176 at the outlet from the turbine 29.

As in the embodiment of FIG. 1, it is possible to couple the circuit 174 from the heat exchanger 4 for heating to ambient temperature to a source of hot water of the co-generation type in order to increase the temperature at the inlet to the turbine 29 and thus increase the energy recovered in the turbine.

At the outlet from the circuit 6a of the condenser 6, a line 177 having a cooling valve V3b serves to feed a cooling circuit.

The outlet from the heat exchanger and evaporator 4 is connected by a line 179 fitted with an isolation valve V2 to a gas pipeline 200.

Valves V4 and V5 serve to isolate the circuit comprising the turbine 29 and the condenser 6. The valve V4 situated in the line 172 also makes it possible to regulate the flow of fluid conveyed to the turbine 29.

It should be observed that the reincorporator of the terminal (not shown in the diagrams) for the purpose of reintroducing a small quantity of recompressed evaporated natural gas, known as "boil-off gas", into the feed line of an HP pump could also be used to replace the buffer volume 7.

In order to ensure satisfactory starting conditions for the HP pump 26, the cold fluid side of the condenser 6 must initially be cooled to the temperature of liquid natural gas. The HP pump portion 26 is also cooled by a fluid flow that is established by opening the valve V3b, while the valve V6 is closed so as to isolate the evaporator 6 (cf. FIG. 2). The motor-driven turbopump 5 is started by the alternator 11 operating in motor mode under the control of the electronic circuit 12, thus serving to cause pressure to rise progressively. The valves V4 and V5 are opened progressively in order to drive the turbine 29. The flow conveyed to the turbine 29 is regulated by the valve V4 which also acts as a regulation valve. When stopping the pump, the valve V4 can be closed in order to stop feeding the turbine 29, after which the motor 11 can be stopped.

The presence of electronic circuits 12 for controlling and regulating the motor-driven turbopump 5 makes it possible to envisage omitting the regulation valve V1 situated in the delivery from the HP pump 26.

The assembly comprising the motor-driven turbopump 5 and the condenser 6 can advantageously be grouped together on a common platform so as to minimize the liquid transfer line and simplify isolation of cold zones (thermal lagging or cold boxes).

Figure 3:
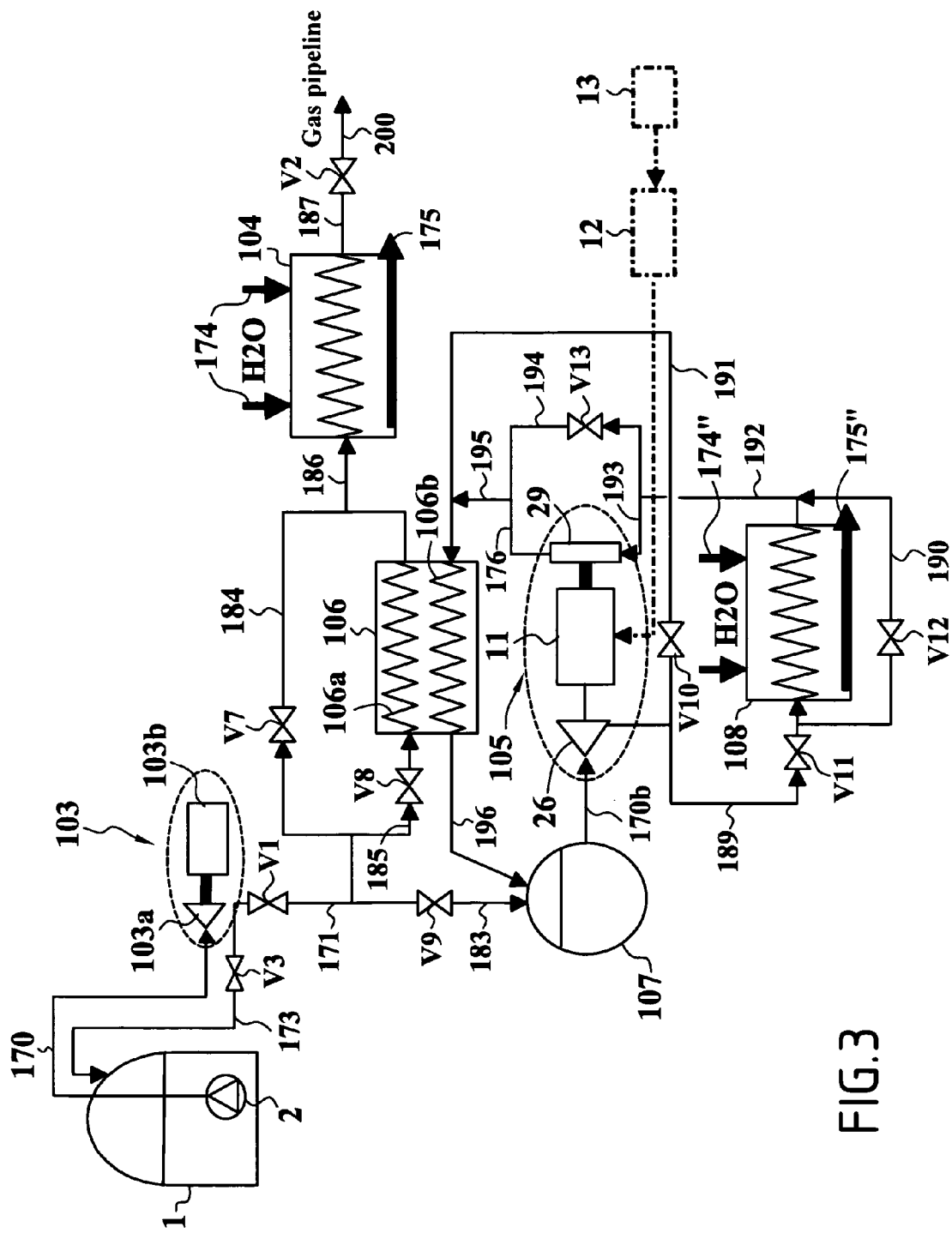

FIG. 3 shows another example of a cycle implementing a motor-driven turbopump 105 in accordance with the invention.

In this embodiment shown in FIG. 3, a conventional high pressure motor-driven pump 103 analogous to the motor-driven pump 303 of FIG. 10 continues to be used, comprising a high pressure pump 103a driven by a motor 103b that may be a conventional electric motor.

In the embodiment of FIG. 3, which includes a motor-driven pump 103 of an existing terminal, a low head loss regulation valve V7 is inserted in the high pressure line 184, 186 connecting the outlet line 171 from the high pressure pump 103a to a conventional heat exchanger and evaporator 104 whose outlet is connected to a gas pipeline 200 via a line 187 that is fitted with an isolation valve V2. The heat exchanger and evaporator 104 comprises in conventional manner a water inlet circuit 174 and a water outlet circuit 175.

In parallel with the line 184 fitted with the low head loss regulation valve V7, a line 185 also fitted with a regulation valve V8 is connected to a circuit 106a of a condenser 106, with the outlet from the circuit 106a being connected to the inlet line 186 of the heat exchanger and evaporator 104.

The function of the valves V7 and V8 is to regulate the flow of liquefied gas taken to the circuit 106a of the condenser 106.

The valve V8 also makes it possible to isolate the condenser 106 from the emission circuit of the terminal and it is used for setting up the energy recovery loop. If the terminal cannot accept any additional head loss on the emission line 171, it is possible to replace the valve V7 by a circulator pump implanted in the line 185 leading to the condenser 106, with the flow rate through the condenser then being regulated by controlling the valve V8 and/or the circulator pump.

In the embodiment of FIG. 3, the energy recovery loop includes a motor-driven turbopump 105 of the above-described type, a heat exchanger and evaporator 108 using hot water or water at ambient temperature, the "hot" circuit 106b or compartment of the condenser 106 and a buffer volume 107 situated upstream from the pump 26, the pipework for transferring fluid, and the various valves for ensuring that the loop operates properly. The recovery loop operates in a closed cycle.

The fluid introduced into the energy recovery loop is taken from the emission line of the terminal, downstream from the high pressure pump 103a by means of a line 183 fitted with a valve V9 that feeds the volume 107.

The heat exchanger and evaporator 108 possesses a circuit 174" for feeding it with water at ambient temperature or at a slightly higher temperature delivered by a co-generation source that is available nearby, with the water being evacuated by a circuit 175".

The fluid delivered by the volume 107 through the line 107b is admitted as a liquid to the inlet of the pump 26 of the motor-driven turbopump 105, is pressurized by said pump 26, and then vaporized and reheated in the water heat exchanger 108 to ambient temperature or to a higher temperature if hot water is used at the inlet 174" of the heat exchanger and evaporator 108. The fluid flowing in the lines 192, 193 is then expanded in the turbine 29 where it delivers more mechanical energy than is required for pumping purposes. The fluid leaving the turbine 29 via the lines 176, 195 is then liquefied at low pressure in the circuit 106b of the condenser 106 and is then recycled by a line 196 into the volume 107 placed at the inlet to the pump 26.

The excess mechanical energy is transformed into electricity by the electrical machine 11 operating in generator mode and it can be delivered to the terminal or to the local electricity network.

In the embodiment of FIG. 3, the implementation of the energy recovery loop essentially comprising the motor-driven turbopump 105, the heat exchanger and evaporator 108, and the condenser 106 can be as follows:

The terminal in which the tank 1 is situated operates conventionally without recovering energy, while the valve V7 is open and the valve V8 is closed. To enable the energy recovery loop to operate, the first step consists in activating the valves V7 and V8 so as to establish a flow of liquid natural gas through the cold compartment 106a of the condenser 106, the valve V8 being opened slowly as to ensure that the condenser 106 cools progressively.

The following step consists in filling the energy recovery loop by opening for natural gas the valve V9, while the valve V11 situated in the line 189 at the inlet to the heat exchanger 108 is closed and the valve V10 situated in the line 191 is open. The evaporation that results from cooling is evacuated to the collection circuit for cooling the terminal, the valve V9 being closed again if the pressure in the volume becomes too great. When there is enough liquid in the volume 107, the motor-driven turbopump 105 can be activated in motor mode, pumping at very low speed so as to establish liquid circulation through the pump. During this period, the leaks from the fluid bearings 31 are collected and evacuated via a three-port valve V15 (see FIG. 8) to a low pressure collector circuit so as to establish fluid flow through the bearings and thus cool them. At the end of this sequence, the pump portions and the bearings of the motor-driven turbopump 105, and also the hot compartment 106b of the condenser 106 are at liquid gas temperature, and the buffer volume 107 is filled with a quantity of liquid that is sufficient to ensure proper operation of the loop. The valve V9 is then closed as is the valve V15 for evacuating bearing leaks to the terminal, and the loop is again isolated from gas emission.

The third step consists in starting the motor-driven turbopump 105 in motor mode using the electronic circuits 12, the valve V11 being open and the valve V10 closed so as to feed the turbine 29, which takes over progressively from the motor and goes on to deliver energy in excess of the needs of the pump 26, enabling the machine to switch into generator mode.

The energy recovery loop possesses a bypass valve V12 in the line 190 for bypassing the heat exchanger and evaporator 108 so as to enable the temperature at the inlet to the turbine 29 to be adjusted and consequently adjust the temperature at the outlet from the condenser 106, and it also includes a valve V13 bypassing the turbine 29 to divert all or some of the flow to a line 194, making it possible for the motor-driven turbopump 105 to be stopped in an emergency in the event of the generator or its electronics breaking down, and if necessary making it possible to regulate the speed of the motor-driven turbopump 105. Advantageously, the electronic power circuits can also serve to regulate the speed of the motor-driven turbopump 105 without prejudice to performance since in this configuration the entire pump flow passes through the turbine 29.

The loop is stopped by closing the valve V11 and opening the valve V10, with the turbine 29 of the motor-driven turbopump 105 then being fed only by the volume of gas contained in the heat exchanger and evaporator 108 and the line upstream therefore stopping progressively. If an emergency stop is necessary, it can be activated by opening the valve V13.

The portion 26 of the motor-driven turbopump 105, and the buffer volume 107, the condenser 106, and the liquid lines are contained in a cold box or lagged so as to avoid heat losses and so as to enable the recovery loop to be paused while full of fluid but not in operation. Advantageously, the volume 107, the motor-driven turbopump 105, the condenser 106, and the valve equipments can be integrated in a common platform.

Figure 4:
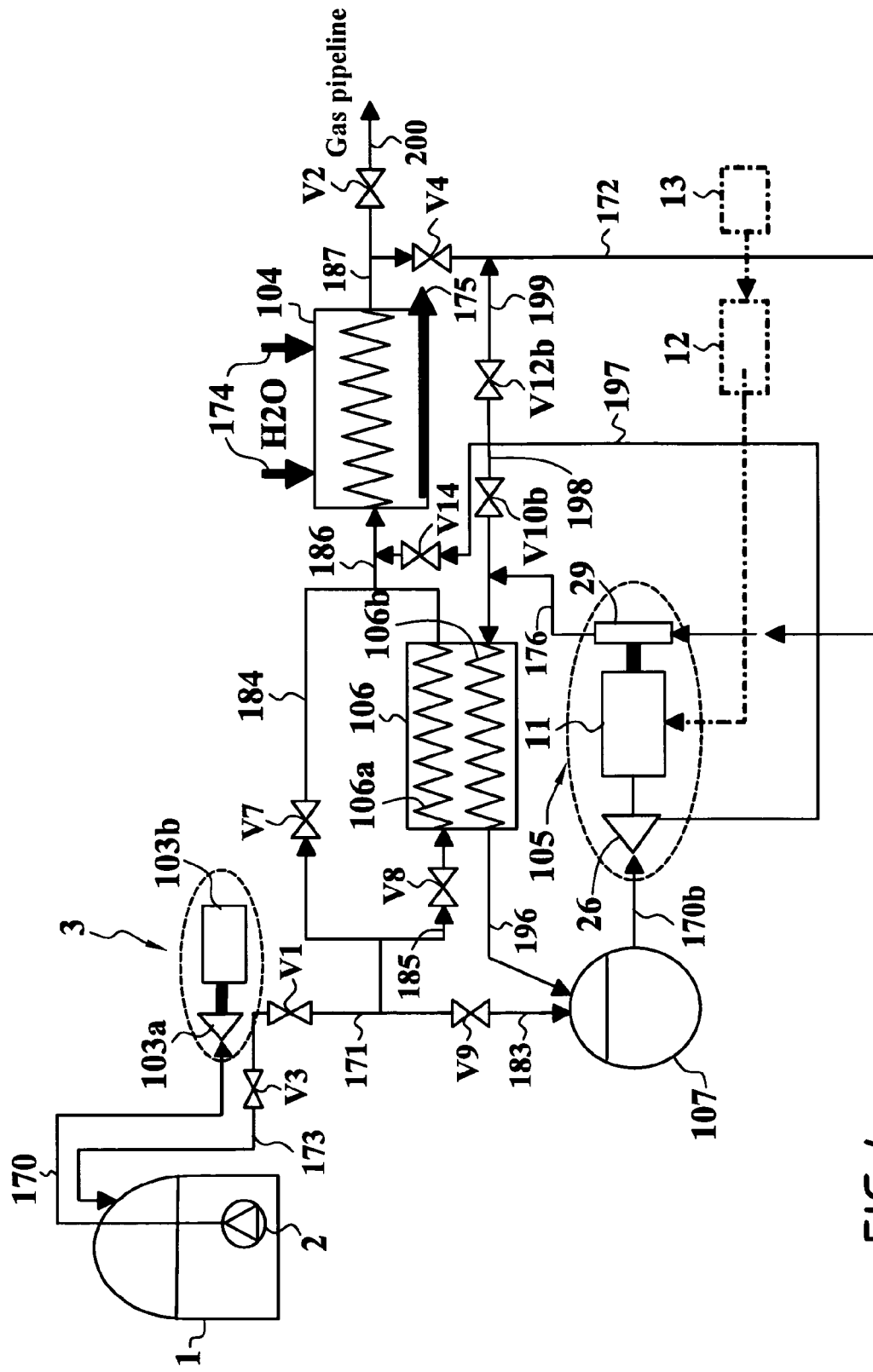

FIG. 4 shows yet another example of a cycle implementing a motor-driven turbopump 105 in accordance with the invention.

The solution shown in FIG. 4 uses the same principle as that described with reference to FIG. 5, while avoiding the use of an additional water heat exchanger such as the heat exchanger 108 in FIG. 3.

As in the preceding embodiment, a fraction of the liquefied gas delivered by the terminal from a tank 1 is taken from the outlet of a traditional high pressure pump 103a upstream from a conventional evaporator 104 in order to be directed to a condenser 106 that is to act as a cold source in an open energy recovery cycle using the same natural gas as that of the terminal.

In the embodiment of FIG. 4, a fraction of the natural gas is taken from the outlet from the conventional heat exchanger and evaporator 104 of a terminal to be expanded in the turbine 29 of the motor-driven turbopump 105 from which the expanded gas then passes through the circuit 106b of the condenser 106 in order to be liquefied and then, after being reintroduced into the volume 107, to flow into the line 170b and be pressurized while in liquid from by the pump 26 of the motor-driven turbopump 105 and subsequently be reinjected by the line 200 and the isolation valve V14 either into the main flow from the terminal at the inlet of the heat exchanger and evaporator 104, or possibly into the flow taken from the pump 103a and acting as a cold source for the circuit 106a of the condenser 106. If the flow is fed to the condenser, then the pump 26 of the motor-driven turbopump 105 must deliver the same high pressure as the high pressure pump 103a of the terminal.

As described above, the solution presented in FIG. 4 differs from that of FIG. 3 by using the heat exchanger and evaporators 104 of the terminal for the energy recovery loop. It can easily be applied to an existing terminal by creating, in addition to the above modifications to the high pressure line (branch connection, valves V7 and V8), two additional interfaces, the first upstream from the heat exchanger and evaporators 104 to reintroduce the liquid natural gas coming from the motor-driven turbopump 105, and the second downstream from the same evaporators 104 to feed the turbine 29 of the motor-driven turbopump 105. The recovery loop then comprises the condenser 106, the motor-driven turbopump 105, and the upstream volume 107, together with the pipework and the valves shown in FIG. 4, and justified by the above-described implementation.

When implementing the embodiment of FIG. 4, as for the embodiment of FIG. 3, the first step consists in activating the valves V7, V8 in order to feed the circuit 106a of the condenser 106 with cold fluid.

The circuit comprising the buffer volume 107, the motor-driven turbopump 105, the pump portion 103a, and the circuit 106b of the condenser 106 (hot side) is filled by opening the valve V9, the valves V4 and V14 being closed and the valve V10b in the line 198 being open. As above, the alternator 11 is set into operation at very low speed in motor mode so as to allow the pump 26 to be used as a fluid circulating pump and so as to cool down the "liquid" portion of the loop. During this stage, leaks from the fluid bearings 31 are evacuated as above via the valve V15 to a low pressure collecting circuit of the terminal.

When the circuits have been cooled sufficiently and the buffer volume 107 presents a sufficient quantity of liquid to enable the pump 26 to operate properly, the valves V10b and V9 are closed and the valve V4 at the inlet to the turbine 29 is opened progressively, and the electrical machine 11 is activated in motor mode simultaneously in order to set the pump 26 into operation. The electrical machine 11 passes into generator mode as soon as the power delivered by the turbine 29 makes that possible, and the valve V14 is opened when the pressure at the outlet from the pump 26 reaches the pressure existing at the inlet of the evaporators 104 of the terminal.

While operating in a loop, the temperature at the inlet to the turbine 29 can be adjusted by acting on the extent to which the valve V12b in the line 199 is open. The speed of rotation of the motor-driven turbopump 105 is regulated by the electronic control circuits.

The recovery loop is stopped by closing the valve V4 feeding the turbine 29, and closing the valve V14 so as to prevent high pressure liquid flowing in the reverse direction through the pump 26 via the line 197. Unlike the above-description solution, once the valve V4 has been closed, there is no large volume of gas trapped upstream from the turbine 29, so there is no need to have a bypass around the turbine 29 for an emergency stop.

The buffer volume 107 is fitted with valve systems enabling the loop to be emptied and enabling excess gas to be evacuated towards the collector circuit of the terminal.

The solution of FIG. 4 lends itself well to a configuration in which the condenser 106, the motor-driven turbopump 105, the volume 107, and the liquid-conveying equipment are integrated in a common platform.

Figure 8:
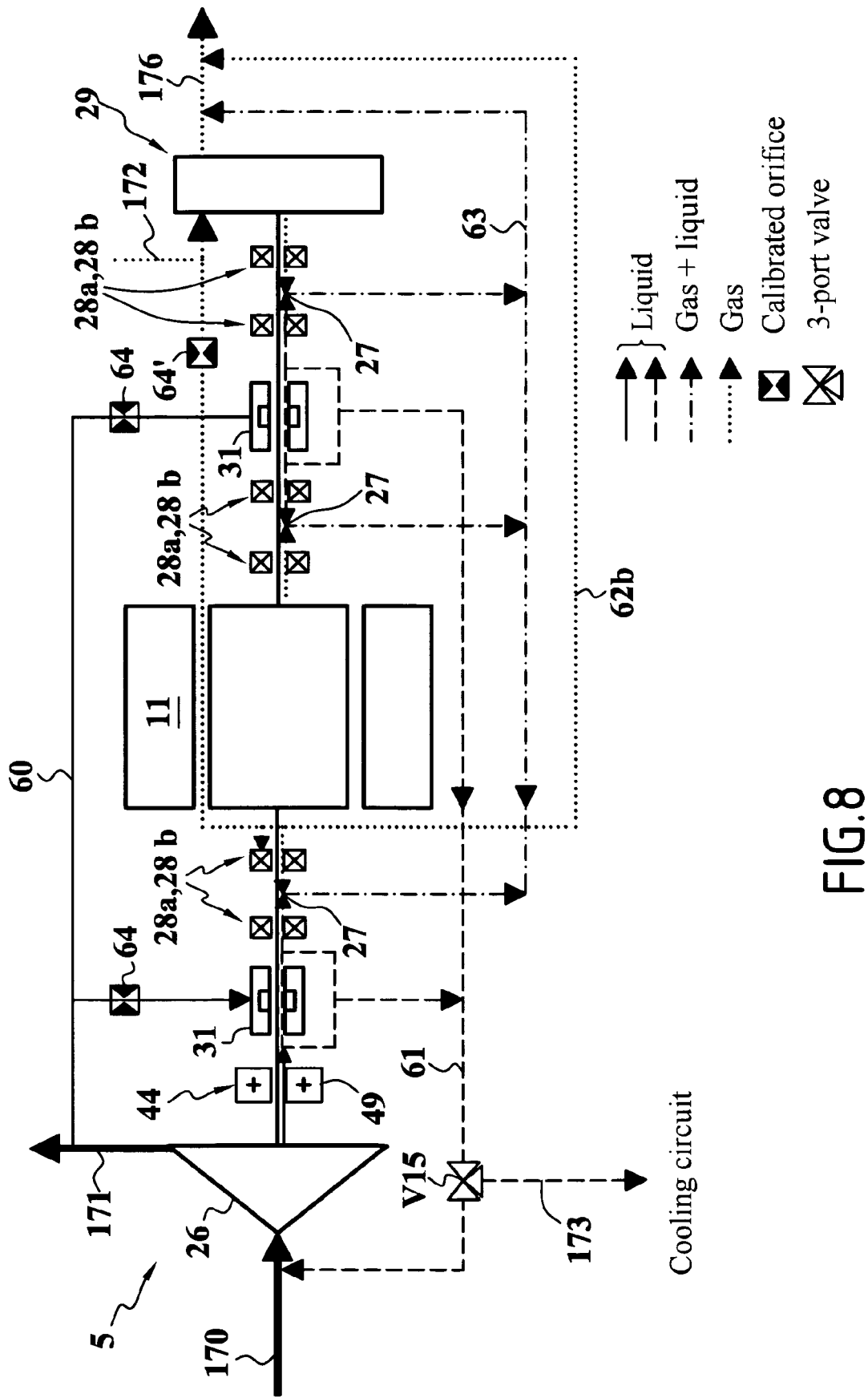
FIG. 8 is a diagrammatic view showing the circulation of fluids in a motor-driven turbopump used in the context of the embodiments of FIGS. 2, 3, and 4.

FIG. 8 shows how the various components of the motor-driven turbopump 5 or 105 and the flows therein are organized in the applications as described above with reference to FIGS. 2 to 4.

In FIG. 8, unlike the diagram of FIG. 7 applicable to the embodiment of FIG. 1, it can be seen that the leaks collected from the dynamic seals 28a, 28b and from cooling the alternator via the line 62b are evacuated via the line 63 to a point downstream of the turbine 29 and not to the inlet of the pump 26.

Other elements common to the diagrams of FIGS. 7 and 8 are not described above.

In the various embodiments described, it should be observed that the heat exchanger and evaporators can be, for example, heat exchangers of the water-trickle type, or of the tube and grille type, or indeed of the type having a coil in a vessel of hot water.

The condenser 106 is typically a plate heat exchanger or a tube and grille type heat exchanger.

The system of the invention is described above in various embodiments with reference to a motor-driven turbopump 5 or 105 associated with a condenser 106 and/or a heat exchanger 4 or 108 and also co-operating where appropriate, with a traditional heat exchanger and evaporator 104 and/or a conventional motor-driven pump 103a.

Nevertheless, the invention is applicable to systems having a larger number of components.

Traditionally, regasification terminals are arranged on the basis of grouping together different functions with batteries of motor-driven HP pumps connected by one or two high pressure lines to batteries of heat exchanger and evaporators. The numbers of pumps and evaporators involved depend on the delivery rate expected of the terminal, and the regulation valves situated at the delivery from the HP pumps, and also those situated downstream from the evaporators, serve to adjust the flow rate and the pressure at the inlet to the pipeline.

Starting up a motor-driven HP pump requires a special sequence. Firstly the motor-driven pump must be cooled to liquid gas temperature by circulating liquid natural gas therethrough at low pressure, which liquid natural gas is then recovered in a specific collector circuit in order to avoid the presence of bubbles of gas in the liquid and cavitation in the pump when in operation. It is this cooling sequence that uses a purge valve 3V3 (cf. FIG. 10). During subsequent starting, and in order to avoid pressure rising too suddenly in the pump fluid so as to avoid any hammer effect, a fraction of the flow is taken from the delivery of the pump and recycled to another collector circuit compatible with the higher pressure. In the context of the present invention, a purge pump 3V2b associated with a cooling circuit is also used with a motor-driven turbopump 5 or 105, as mentioned in the various embodiments of FIGS. 1 to 4.

What is claimed is:

1. A compressor-evaporator system for liquefied gas contained in a tank, the system comprising extraction and pump means for extracting and delivering liquefied gas under low pressure outside the tank, high pressure pump means, evaporator means operating by heat exchange with a liquid, and means for conditioning and transferring gas to a gas pipeline, the system comprising at least one turbomachine constituted by a motor-driven turbopump comprising a rotary assembly having very high bending stiffness on a common shaft line, with at least one high pressure pump comprising an axial suction stage and at least one centrifugal wheel, a turbine, and a central electrical machine capable of being used in motor mode or in generator mode and situated between the high pressure pump and the turbine, said motor-driven turbopump being arranged in compact manner inside a rigid casing that presents static seals only with the surrounding medium, the rotary assembly of the motor-driven turbopump being adapted to present a high speed of rotation, greater than 12,000 rpm, while remaining outside the excitation ranges of critical speeds of rotation, all of the internal portions of the motor-driven turbopump being immersed in a cryogenic fluid that is the same as the liquefied gas contained in the tank, the internal cavities of the motor-driven turbopump that are under different thermodynamic conditions being separated by contactless dynamic seals, and electronic power circuits connected to an electricity network serving to control the central electrical machine in motor mode or generator mode.

2. A system according to claim 1, wherein the speed of rotation of the rotary assembly of the motor-driven turbopump lies in the range 20,000 rpm to 40,000 rpm.

3. A system according to claim 1, including a first heat exchanger and evaporator interposed between the high pressure pump and the turbine to compress and to evaporate the liquefied gas used as the working fluid in the motor-driven turbopump.

4. A system according to claim 3, wherein the high pressure pump means comprise exclusively the high pressure pump of the motor-driven turbopump connected in series between the tank and the pipeline.

5. A system according to claim 3, wherein the means for evaporation by heat exchange with a liquid comprise said first heat exchanger and evaporator interposed between the high pressure pump and the turbine, and a second heat exchanger and evaporator disposed between the turbine and the pipeline to be fed.

6. A system according to claim 1, further comprising a buffer volume disposed at the inlet to the high pressure pump of the motor-driven turbopump.

7. A system according to claim 3, further comprising a buffer volume disposed at the inlet to the high pressure pump of the motor-driven turbopump, a condenser with a first circuit interposed between the outlet of the high pressure pump of the motor-driven turbopump and the first heat exchanger and evaporator, and a second circuit interposed between the outlet of the turbine of the motor-driven turbopump and the buffer volume, the second circuit being in heat exchange with the first circuit to reliquefy the gas leaving said turbine.

8. A system according to claim 6, wherein the high pressure pump means comprise a motor-driven pump having its inlet connected to said extraction and pump means, and having its outlet connected to a first circuit of a condenser, the outlet from said first circuit being connected to the inlet of a heat exchanger and evaporator whose outlet is connected to said pipeline, wherein said buffer volume is in a branch connection connected to the outlet of said motor-driven pump, and wherein the outlet from the turbine of the motor-driven turbopump is connected to the inlet of a second circuit of the condenser, the outlet from said second circuit being connected to said buffer volume, the second circuit being in heat exchange with the first circuit to reliquefy the gas leaving said turbine.

9. A system according to claim 1, wherein the means for evaporation by heat exchange with a liquid comprise means for introducing and evacuating a liquid constituted by water at a temperature that is not less than ambient temperature.

10. A system according to claim 3, wherein the first heat exchanger and evaporator interposed between the high pressure pump and the turbine includes means for introducing and evacuating a liquid constituted by water at a temperature that is not less than ambient temperature.

11. A system according to claim 1, wherein the motor-driven turbopump includes hydrostatic fluid bearings fed with a fluid in the liquid and compressed state that is the same as the fluid available from the outlet of the high pressure pump of the motor-driven turbopump.

12. A system according to claim 11, wherein the motor-driven turbopump includes an active hydraulic device for balancing axial forces, which device is fed with a fluid in the liquid and compressed state that is the same as the fluid available from the outlet of the high pressure pump of the motor-driven turbopump.

13. A system according to claim 11, wherein the motor-driven turbopump includes an axial fluid abutment fed with a fluid in the liquid and compressed state that is the same as the fluid available from the outlet of the high pressure pump of the motor-driven turbopump.

14. A system according to claim 1, wherein the motor-driven turbopump includes active magnetic bearings.

15. A system according to claim 14, wherein the motor-driven turbopump includes a magnetic axial abutment.

16. A system according to claim 1, wherein the motor-driven turbopump includes high speed ball bearings with ceramic balls.

17. A system according to claim 1, wherein the turbine of the motor-driven turbopump comprises a rotor of high-strength titanium alloy of the TA6 V ELI or TA5 E ELI type or of light alloy of the aluminum-lithium type.

18. A system according to claim 1, wherein the high pressure pump of the motor-driven turbopump comprises one or more impellers of high-strength titanium alloy of the TA6 V ELI or TA5 E ELI type or of light alloy of the aluminum-lithium type.

19. A system according to claim 1, wherein the central electrical machine of the motor-driven turbopump comprises a permanent magnet rotor, the electronic power circuit delivering power at a frequency synchronous with the speed of rotation and at variable voltage in motor mode, and converting the variable voltage that is created in generator mode into a rectified constant voltage.

20. A system according to claim 1, wherein the central electrical machine of the motor-driven turbopump has a one-piece rotor with an excitation coil fed by a rotary transformer and a rectifier diode bridge for regulating the excitation of the electrical machine and for providing a constant voltage in generator mode and controlled torque in motor mode.

21. A system according to claim 1, wherein the central electrical machine of the motor-driven turbopump includes a squirrel-cage rotor, the electronic power circuit delivering power at variable voltage and frequency in motor mode and converting the variable voltage that is created in generator mode into a rectified constant voltage.

22. A system according to claim 1, the system being applied to a liquefied gas of the liquefied natural gas type.

* * * * *